(12) United States Patent
Yan et al.

(10) Patent No.: US 12,646,187 B2
(45) Date of Patent: Jun. 2, 2026

(54) METHOD AND DEVICE FOR ALIGNING LASER POINT CLOUD AND IMAGE BASED ON DEEP LEARNING

(71) Applicants: CHINA UNIVERSITY OF GEOSCIENCES (WUHAN), Wuhan (CN); Institute of Rock and Soil Mechanics, Chinese Academy of Sciences, Wuhan (CN)

(72) Inventors: Xuefeng Yan, Wuhan (CN); Yuyong Jiao, Wuhan (CN); Yule Hu, Wuhan (CN); Zengqiang Han, Wuhan (CN); Yiteng Wang, Wuhan (CN); Luyi Shen, Wuhan (CN); Junpeng Zou, Wuhan (CN); Fei Zheng, Wuhan (CN); Peng Zhang, Wuhan (CN)

(73) Assignees: CHINA UNIVERSITY OF GEOSCIENCES (WUHAN), Wuhan (CN); Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 215 days.

(21) Appl. No.: 18/398,179

(22) Filed: Dec. 28, 2023

(65) Prior Publication Data

US 2025/0022151 A1 Jan. 16, 2025

(30) Foreign Application Priority Data

Jul. 10, 2023 (CN) .......................... 202310845155.4

(51) Int. Cl.
*G06V 10/42* (2022.01)
*G06T 5/70* (2024.01)
(Continued)

(52) U.S. Cl.
CPC ................ *G06T 7/344* (2017.01); *G06T 5/70* (2024.01); *G06T 7/75* (2017.01); *G06T 17/20* (2013.01);
(Continued)

(58) Field of Classification Search
CPC .. G06T 7/344; G06T 7/75; G06T 5/70; G06T 17/20; G06T 2200/04; G06T 2207/20081;
(Continued)

(56) References Cited

U.S. PATENT DOCUMENTS 8,452,089 B2 5/2013 Yu et al.
11,455,720 B2 9/2022 Yoo
(Continued)

*Primary Examiner* — Xiao M Wu
*Assistant Examiner* — Ryan Allen Barham

(57) ABSTRACT
A method for aligning a laser point cloud and an image based on deep learning includes: collecting data by using a laser ladar and a camera, to obtain laser point cloud data and a two-dimensional (2D) image respectively; dividing pre-processed point cloud data into triangular meshes to obtain a three-dimensional (3D) mesh model of the point cloud data; determining a relative location relationship between a laser radar and the multi-function camera, and constructing a virtual camera in the 3D mesh model to capture a simulated 2D image at a same location and angle as those of the camera; and aligning, by using a convolution neural network (CNN), the 2D image captured by the camera and the simulated 2D image captured by the virtual camera to generate aligned images that map onto each other.

6 Claims, 2 Drawing Sheets

(51) Int. Cl.
| | |
|---|---|
| *G06T 7/33* | (2017.01) |
| *G06T 7/73* | (2017.01) |
| *G06T 17/20* | (2006.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC ............ *G06V 10/42* (2022.01); *G06V 10/764* (2022.01); *G06V 10/774* (2022.01); *G06V 10/776* (2022.01); *G06V 10/82* (2022.01); *G06T 2200/04* (2013.01); *G06T 2207/20081* (2013.01); *G06T 2207/20084* (2013.01); *G06T 2207/30244* (2013.01); *G06T 2210/56* (2013.01)

(58) Field of Classification Search
CPC . G06T 2207/20084; G06T 2207/30244; G06T 2210/56; G06V 10/42; G06V 10/82; G06V 10/774; G06V 10/776; G06V 10/764
See application file for complete search history.

(56)        References Cited

U.S. PATENT DOCUMENTS

| | | | |
|---|---|---|---|
| 11,461,599 B2 | 10/2022 | Ordonez | |
| 12,130,401 B1 * | 10/2024 | Fang ...................... | G08B 21/10 |
| 12,271,790 B1 * | 4/2025 | King ...................... | G01S 17/66 |
| 2024/0037707 A1 * | 2/2024 | Shan ......................... | G06T 3/40 |

* cited by examiner

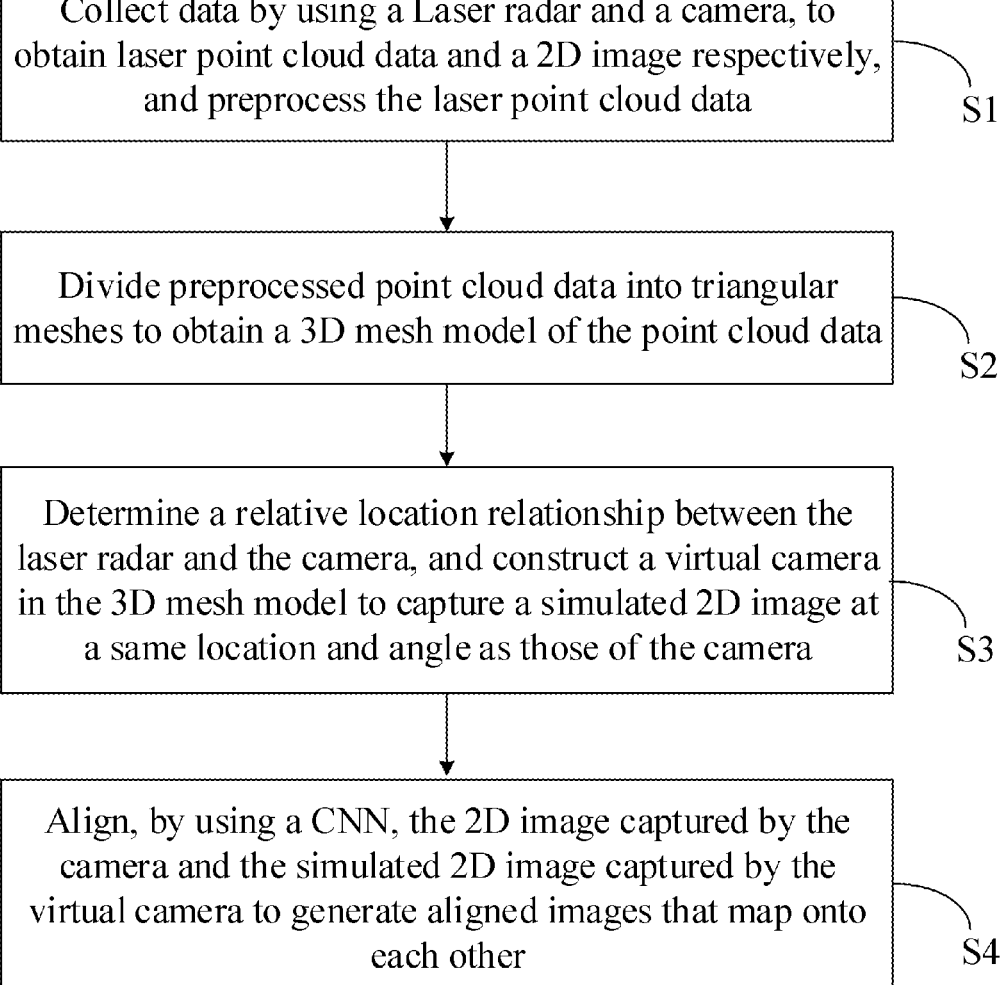

Collect data by using a Laser radar and a camera, to obtain laser point cloud data and a 2D image respectively, and preprocess the laser point cloud data

S1

Divide preprocessed point cloud data into triangular meshes to obtain a 3D mesh model of the point cloud data

S2

Determine a relative location relationship between the laser radar and the camera, and construct a virtual camera in the 3D mesh model to capture a simulated 2D image at a same location and angle as those of the camera

S3

Align, by using a CNN, the 2D image captured by the camera and the simulated 2D image captured by the virtual camera to generate aligned images that map onto each other

METHOD AND DEVICE FOR ALIGNING LASER POINT CLOUD AND IMAGE BASED ON DEEP LEARNING

CROSS-REFERENCE TO RELATED APPLICATIONS

This application claims priority to Chinese Patent Application No. 202310845155.4 with a filing date of Jul. 10, 2023. The content of the aforementioned application, including any intervening amendments thereto, is incorporated herein by reference.

TECHNICAL FIELD

The present disclosure relates to the field of image alignment, and in particular, to a method and device for aligning a laser point cloud and an image based on deep learning.

BACKGROUND

The laser vision fusion technology combines laser scanning and computer vision to achieve more accurate and efficient three-dimensional (3D) perception and recognition. By combining precise ranging of the laser scanning and image processing of the computer vision, the laser vision fusion technology can obtain 3D information of a scenario in real time or offline, and fuse the obtained 3D information and a visual image.

In the laser vision fusion technology, a laser scanner is usually used to measure a location and a shape of an object in the scenario. The laser scanner calculates a distance between the object and the scanner by emitting a laser beam and measuring return time of the laser beam, thereby obtaining 3D point cloud data of the scenario. The point cloud data provides accurate spatial location and shape information of the object.

The computer vision is responsible for extracting a feature from an image captured by a sensor (such as a camera) and analyzing the feature. A computer vision algorithm can be used to detect and recognize the object, and extract features of the object, such as a color, a texture, and a shape.

The key to the laser vision fusion technology lies in effective fusion of laser scanning data and computer vision data. This can be achieved by aligning and registering laser point cloud data and an image. The laser point cloud data is mapped onto an image coordinate system, such that an accurate spatial location of a point cloud can be corresponding to a pixel in the image, thus fusing the point cloud and the image. This can be achieved through calibration between the laser scanner and the camera. During the calibration, a transformation matrix between the laser scanner and the camera is obtained to map the laser scanning data onto the image coordinate system of the camera.

However, it is difficult to achieve the calibration between the laser scanner and the camera. In practical engineering applications, there is often a certain error, and it is difficult to correct the error by using a pure mathematical method.

SUMMARY OF PRESENT INVENTION

In order to solve the above problems, the present disclosure provides a method for aligning a laser point cloud and an image based on deep learning, including the following steps:

S1, collecting data by using a laser radar and a camera, to obtain laser point cloud data and a two-dimensional (2D) image respectively, and preprocessing the laser point cloud data;

S2, dividing the preprocessed laser point cloud data into triangular meshes to obtain a 3D mesh model of the laser point cloud data;

S3, determining a relative location relationship between the laser radar and the multi-function camera, and constructing a virtual camera in the 3D mesh model to capture a simulated 2D image at a same location and angle as those of the camera; and S4, aligning, by using a convolution neural network (CNN), the 2D image captured by the camera and the simulated 2D image captured by the virtual camera to generate aligned images that map onto each other.

In one embodiment, the preprocessing the laser point cloud data in step S1 includes denoising, filtering, outlier removal, and feature extraction.

In one embodiment, the feature extraction specifically includes:

(1) confirming label or category information of the point cloud data, and reprocessing the point cloud data, where the reprocessing includes normalization, centralization, and scaling;

(2) inputting reprocessed point cloud data into a network PointNet for encoding, where the PointNet extracts a global feature representation of a point cloud by using a multilayer perceptron (MLP) and a symmetric function, the MLP processes a feature of each point, and the symmetric function merges the feature of each point into a global feature of the entire point cloud;

(3) inputting the global feature of the point cloud into an output layer of the PointNet for prediction or classification, and predicting a label or a category of the point cloud; and (4) classifying manually-annotated point cloud data and adding a real label to the manually-annotated point cloud data, dividing the manually-annotated point cloud data into a test set and a verification set, training the PointNet by using the test set, measuring a difference between a PointNet prediction result and the real label by using a cross-entropy loss function, adjusting a weight parameter of the PointNet by using a back-propagation algorithm and a gradient descent algorithm, to enable the network to learn a more accurate point cloud feature, and evaluating a trained PointNet model by using the verification test.

In one embodiment, step S2 specifically includes:

S21, reading out all points in the preprocessed point cloud data, and selecting the first four non-coplanar points to form a first tetrahedron;

S22, selecting a new point; determining a spatial location of the point; and executing step S23 when the point is outside all existing tetrahedrons, executing step S24 when the point is inside an existing tetrahedron A2, executing step S25 when the point falls within a triangular face B3 of an existing tetrahedron, executing step S26 when the point falls on an edge C4 of an existing tetrahedron, or discarding the point and executing step S22 again when the point coincides with a vertex of an existing tetrahedron;

S23, finding a triangular face B1 of an existing tetrahedron closest to the point, constructing a new tetrahedron based on the point and three vertices of the triangular face B1, and executing step S27;

S24, splitting the tetrahedron A2 into four new tetrahedrons, wherein the four new tetrahedrons are formed by connecting the point and vertices of each of four faces of the tetrahedron A2 to obtain four new tetrahedrons respectively, and executing step S27;

S25, connecting the point with three vertices of the triangular face B3 to divide the triangular face B3 into three new triangular faces, connecting vertices of each of the three new triangular faces to the other vertex of the tetrahedron in which the triangular face B3 is located, to divide the tetrahedron in which the triangular face B3 is located into three new tetrahedrons, and executing step S27;

S26, connecting the point to all vertices of the tetrahedron in which the edge C4 is located, to divide the tetrahedron in which the edge C4 is located into two new tetrahedrons, and executing step S27;

S27, using a Lawson algorithm to check whether there is a tetrahedron that does not comply with an "empty sphere" criterion, and when there is a tetrahedron that does not comply with the "empty sphere" criterion, making an adjustment and executing step S28; and S28, when all the points have been traversed, ending the algorithm; otherwise, executing step S22.

In one embodiment, step S4 specifically includes:

S41, obtaining a 2D image captured by the camera and a simulated 2D image captured by the virtual camera that are a pair of images with a correspondence, and preprocessing the pair of images to obtain to-be-aligned images, where the preprocessing includes normalization, size adjustment, and channel adjustment;

S42, inputting the to-be-aligned images in the S41 into the CNN for feature extraction, and generating labels for the to-be-aligned images;

S43, using the generated labels as supervisory signals and the to-be-aligned images as a training set to train the CNN by using a backpropagation algorithm and an optimization algorithm, and adjusting a weight parameter of the CNN;

S44, using the manually-aligned to-be-aligned images as the verification set to verify the trained CNN, and adjusting a hyperparameter and a network structure of the CNN based on performance of the verification set; and S45, inputting the to-be-aligned images into the verified CNN to obtain an alignment result output by the network.

The present disclosure further provides a device for aligning a laser point cloud and an image based on deep learning, including:

a processor; and a memory storing a computer program that can run on the processor; where the computer program is executed by the processor to implement the above method for aligning a laser point cloud and an image based on deep learning.

The technical solutions provided by the present disclosure have following beneficial effects.

The present disclosure provides a method for aligning a laser point cloud and an image based on deep learning. The method preprocesses point cloud data by using a point cloud processing network PointNet, makes full use of original information and a global feature representation of a point cloud, and efficiently and accurately analyzes and processes the point cloud. A CNN is used to calibrate an alignment relationship between a simulated 2D image captured by a virtual camera and a 2D image captured by a multi-functional camera, adaptively correct a device error, and obtain a more accurate alignment relationship.

BRIEF DESCRIPTION OF THE DRAWINGS

FIG. 1 is a flowchart showing a method for aligning a laser point cloud and an image based on deep learning according to an embodiment of the present disclosure.

DETAILED DESCRIPTION OF THE EMBODIMENTS

Figure 2:
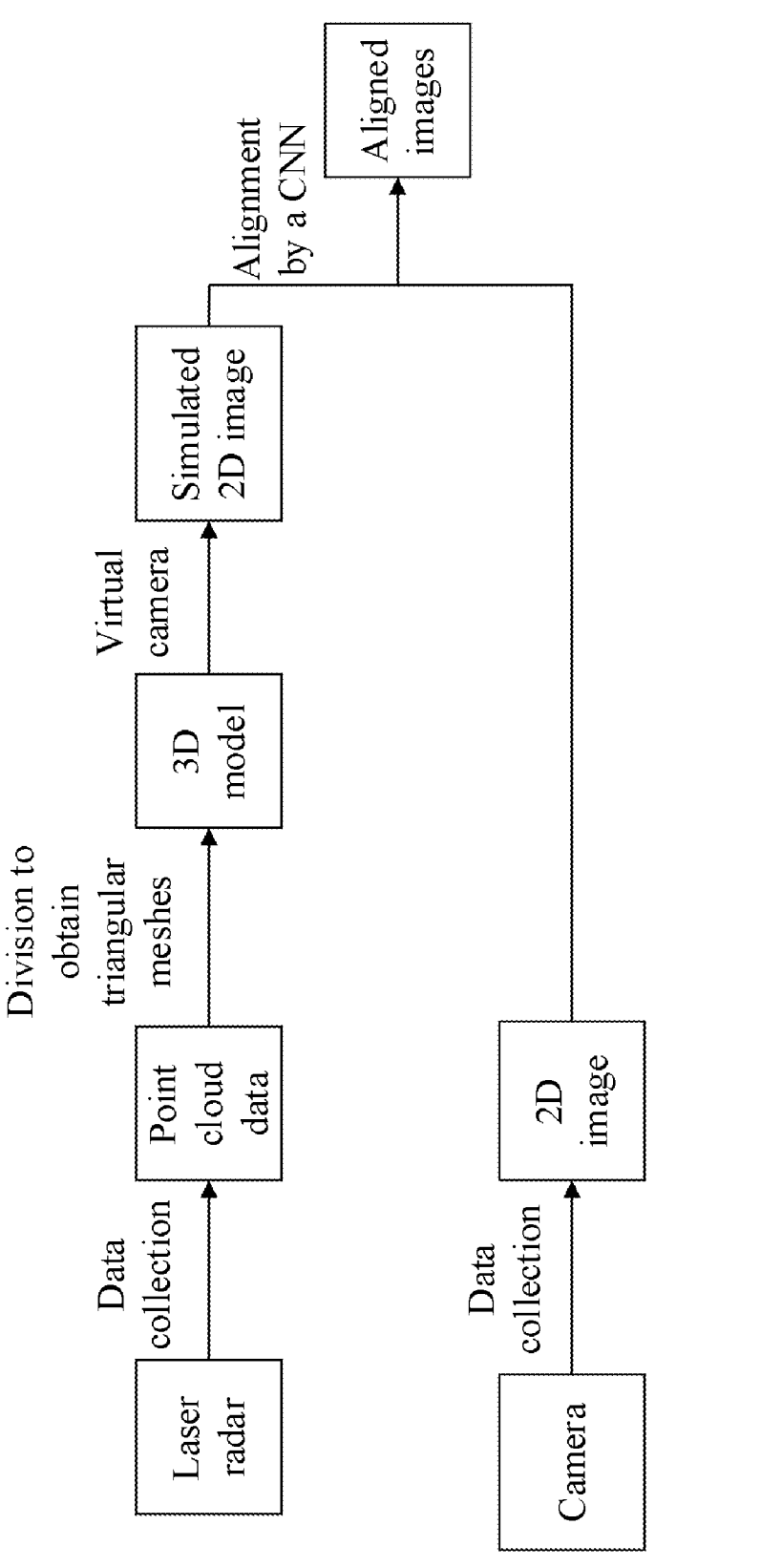
FIG. 2 is a flow block diagram showing a method for aligning a laser point cloud and an image based on deep learning according to an embodiment of the present disclosure.

In order to make the objectives, technical solutions, and advantages of the present disclosure clearer, implementations of the present disclosure will be further described in detail in conjunction with the accompanying drawings.

FIG. 1 is a flowchart showing a method for aligning a laser point cloud and an image based on deep learning according to an embodiment of the present disclosure. A flow block diagram showing the method for aligning a laser point cloud and an image based on deep learning according to this embodiment of the present disclosure is shown in FIG. 2. The method for aligning a laser point cloud and an image based on deep learning specifically includes the following steps:

In S1, data is collected by using a laser radar and a camera, to obtain laser point cloud data and a 2D image, and the laser point cloud data is preprocessed. The preprocessing of the laser point cloud data includes denoising, filtering, outlier removal, and feature extraction.

A feature representation of the point cloud data is automatically learned by using a point cloud processing network (PointNet), to improve an effect of the preprocessing. Specific steps are as follows:

(1) Label or category information of the point cloud data is obtained, and the point cloud data is reprocessed to meet an input requirement of the PointNet. The reprocessing includes normalization, centralization, scaling, and other operations, such that point clouds are uniformly distributed within a same scale range.

(2) Reprocessed point cloud data is input into the PointNet for encoding. The PointNet extracts a global feature representation of a point cloud by using an MLP and a symmetric function. The MLP processes a feature of each point, and the symmetric function merges the feature of each point into a global feature of the entire point cloud. A plurality of MLP layers can be used to gradually extract a higher-level feature to capture different levels of information in the point cloud data.

(3) The global feature of the point cloud is input into an output layer of the PointNet for prediction or classification, and a label or a category of the point cloud is predicted.

(4) Manually-annotated point cloud data is classified, and a real label is added to the manually-annotated point cloud data. The manually-annotated point cloud data is divided into a test set and a verification set. The PointNet is trained by using the test set. A difference between a PointNet prediction result and the real label is measured by using a cross-entropy loss function. A weight parameter of the PointNet is adjusted by using a backpropagation algorithm and a gradient descent algorithm, to enable the network to learn a more accurate point cloud feature. A trained PointNet model is evaluated by using the verification test. Accuracy, precision, a recall rate, and other indicators of the model in prediction and classification tasks are calculated to evaluate performance of the model.

In S2, preprocessed point cloud data is divided into triangular meshes to obtain a 3D mesh model of the point cloud data.

This step specifically includes following substeps:

In S21, all points in the preprocessed point cloud data are read out, and the first four non-coplanar points are selected to form a first tetrahedron with four triangular faces.

In S22, a new point is taken, and a spatial location of the point is determined. If the point is outside all existing tetrahedrons, step S23 is performed. If the point is inside an existing tetrahedron A2, step S24 is performed. If the point falls within a triangular face B3 of an existing tetrahedron, step S25 is performed. If the point falls on an edge C4 of an existing tetrahedron, step S26 is performed. If the point coincides with a vertex of an existing tetrahedron, the point is discarded, and step S22 is performed again.

In the S23, a triangular face B1 of an existing tetrahedron closest to the point is found, a new tetrahedron is constructed based on the point and three vertices of the triangular face B1, and step S27 is performed.

In the S24, the tetrahedron A2 is split into four new tetrahedrons. The four new tetrahedrons are formed by connecting the point and vertices of each of four faces of the tetrahedron A2 respectively, and step S27 is performed.

In the S25, the point is connected to three vertices of the triangular face B3, and the triangular face B3 is divided into three new triangular faces. Vertices of each of the three new triangular faces are connected to the other vertex of the tetrahedron in which the triangular face B3 is located, to divide the tetrahedron in which the triangular face B3 is located into three new tetrahedrons, and step S27 is performed.

In the S26, the point is connected to all vertices of the tetrahedron in which the edge C4 is located, to divide the tetrahedron in which the edge C4 is located into two new tetrahedrons, and step S27 is performed.

In the S27, a Lawson algorithm is used to check whether there is a tetrahedron that does not comply with an "empty sphere" criterion. If there is a tetrahedron that does not comply with the "empty sphere" criterion, an adjustment is made, and step S28 is performed.

In the S28, if all the points have been added, the algorithm ends; otherwise, step S22 is performed.

In S3, a relative location relationship between the LiDAR and the camera is determined, and a virtual camera is constructed in the 3D mesh model to capture a simulated 2D image at a same location and angle as the camera.

To construct the virtual camera, it is necessary to ensure that a location and a shooting angle of the virtual camera in the 3D model are consistent with those of the camera. In addition, the virtual camera has same shooting parameters such as a focal length, an aperture, a shutter speed, and sensitivity as the camera.

In S4, the 2D image captured by the camera and the simulated 2D image captured by the virtual camera are aligned by using a CNN, to generate aligned images that map onto each other.

This step specifically includes following substeps:

In S41, a 2D image captured by the camera and a simulated 2D image captured by the virtual camera that are a pair of images with a correspondence are obtained, and are preprocessed to obtain to-be-aligned images. The preprocessing includes image normalization, size adjustment, and channel adjustment.

In S42, the to-be-aligned images in the S41 are input into the CNN for feature extraction, and labels are generated for the to-be-aligned images.

In S43, the generated labels are used as supervisory signals, and the to-be-aligned images are used as a training set to train the CNN by using a backpropagation algorithm and an optimization algorithm. A weight parameter of the CNN is adjusted to enable the network to learn an accurate transformation or alignment result of the to-be-aligned images.

In S44, the manually-aligned to-be-aligned images are used as the verification set to verify a trained CNN. Performance of the model is monitored, and a hyperparameter and a network structure of the CNN are adjusted based on performance of the verification set to improve the performance and a generalization capability of the model.

In S45, the to-be-aligned images are input into a verified CNN to obtain an alignment result output by the network.

The embodiments further provide a device for aligning a laser point cloud and an image based on deep learning, including:

a processor; and a memory storing a computer program that can run on the processor.

The computer program is executed by the processor to implement the method for aligning a laser point cloud and an image based on deep learning.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Accordingly, the present disclosure will not be limited to these embodiments shown herein, but is to fall within the widest scope consistent with the principles and novel features disclosed herein.

What is claimed is:

1. A method for aligning a laser point cloud and an image based on deep learning, comprising the following steps:

S1, collecting data by using a laser radar and a camera, to obtain laser point cloud data and a two-dimensional (2D) image respectively, and preprocessing the laser point cloud data;

S2, dividing the preprocessed laser point cloud data into triangular meshes to obtain a three-dimensional (3D) mesh model of the laser point cloud data;

S3, determining a relative location relationship between the laser radar and the camera, and constructing a virtual camera in the 3D mesh model to capture a simulated 2D image at a same location and angle as those of the camera; and S4, aligning, by using a convolution neural network (CNN), the 2D image captured by the camera and the simulated 2D image captured by the virtual camera to generate aligned images that map onto each other;

wherein step S4 comprises:

S41, obtaining a 2D image captured by the camera and a simulated 2D image captured by the virtual camera that are a pair of images with a correspondence, and preprocessing the pair of images to obtain to-be-aligned images, wherein the preprocessing comprises image normalization, size adjustment, and channel adjustment;

S42, inputting the to-be-aligned images in the S41 into the CNN for feature extraction, and generating labels for the to-be-aligned images;

S43, using the generated labels as supervisory signals and the to-be-aligned images as a training set to train the CNN by using a backpropagation algorithm and an optimization algorithm, and adjusting a weight parameter of the CNN;

S44, using the manually-aligned to-be-aligned images as a verification set to verify the trained CNN, and adjusting a hyperparameter and a network structure of the CNN based on performance of the verification set; and S45, inputting the to-be-aligned images into the verified CNN to obtain an alignment result output by the network.

2. The method according to claim 1, wherein, the preprocessing the laser point cloud data in step S1 comprises denoising, filtering, outlier removal, and feature extraction.

3. The method according to claim 2, wherein the feature extraction specifically comprises:

(1) confirming label or category information of the laser point cloud data, and reprocessing the laser point cloud data, wherein the reprocessing comprises normalization, centralization, and scaling;

(2) inputting the reprocessed laser point cloud data into a network PointNet for encoding, wherein the PointNet extracts a global feature representation of the laser point cloud by using a multilayer perceptron (MLP) and a symmetric function, the MLP processes a feature of each point, and the symmetric function merges the feature of each point into a global feature of the laser point cloud;

(3) inputting the global feature of the laser point cloud into an output layer of the PointNet for prediction or classification, and predicting a label or a category of the laser point cloud; and (4) classifying manually-annotated point cloud data and adding a real label to the manually-annotated point cloud data, dividing the manually-annotated point cloud data into a test set and a verification set, training the PointNet by using the test set, measuring a difference between a PointNet prediction result and the real label by using a cross-entropy loss function, adjusting a weight parameter of the PointNet by using a backpropagation algorithm and a gradient descent algorithm, to enable the network to learn a more accurate point cloud feature, and evaluating a trained PointNet model by using the verification test.

4. The method according to claim 3, wherein evaluation indicators for evaluating the trained PointNet model by using the verification test comprise accuracy, precision, and a recall rate of the trained PointNet model in prediction and classification tasks.

5. The method according to claim 1, wherein step S2 specifically comprises:

S21, reading out all points in the preprocessed laser point cloud data, and selecting first four non-coplanar points to form a first tetrahedron;

S22, selecting a new point; determining a spatial location of the new point; and executing step S23 when the new point is outside all existing tetrahedrons, executing step S24 when the new point is inside a first existing tetrahedron (A2), executing step S25 when the new point falls within a first triangular face (B3) of a second existing tetrahedron, executing step S26 when the new point falls on an edge (C4) of a third existing tetrahedron, and discarding the new point and executing step S22 again when the new point coincides with a vertex of a fourth existing tetrahedron;

S23, finding a second triangular face (B1) of a fifth existing tetrahedron closest to the new point, constructing a new tetrahedron based on the new point and three vertices of the second triangular face (B1), and executing step S27;

S24, splitting the first existing tetrahedron (A2) into four new tetrahedrons, wherein the four new tetrahedrons are formed by connecting the new point and vertices of each of four faces of the first existing tetrahedron (A2) respectively, and executing step S27;

S25, connecting the new point with three vertices of the first triangular face (B3) to divide the first triangular face (B3) into three new triangular faces, connecting vertices of each of the three new triangular faces to another vertex of the second existing tetrahedron in which the first triangular face (B3) is located, to divide the second existing tetrahedron in which the first triangular face (B3) is located into three new tetrahedrons, and executing step S27;

S26, connecting the new point to all vertices of the third existing tetrahedron in which the edge (C4) is located, to divide the third existing tetrahedron in which the edge (C4) is located into two new tetrahedrons, and executing step S27;

S27, using a Lawson algorithm to check whether there is a tetrahedron that does not comply with an "empty sphere" criterion, and when there is a tetrahedron that does not comply with the "empty sphere" criterion, making an adjustment and executing step S28; and S28, when all the points have been traversed, ending the algorithm; otherwise, executing step S22.

6. A device for aligning a laser point cloud and an image based on deep learning, wherein the device comprises:

a processor; and a memory storing a computer program that runs on the processor; wherein the computer program is executed by the processor to implement the method according to claim 1.

* * * * *